(12) United States Patent
Sakamura et al.

(10) Patent No.: US 8,306,919 B2
(45) Date of Patent: Nov. 6, 2012

(54) IC CARD AND AUTHENTICATION METHOD IN ELECTRONIC TICKET DISTRIBUTION SYSTEM

(75) Inventors: Ken Sakamura, Shinagawa-ku (JP); Noboru Koshizuka, Musashino (JP); Hiroshi Aono, Yokosuka (JP); Kazuhiko Ishii, Yokohama (JP); Kensaku Mori, Yokohama (JP); Sadayuki Hongo, Yokohama (JP)

(73) Assignees: Ken Sakamura, Tokyo (JP); Noburu Koshizuka, Musashino-shi (JP); NTT DoCoMo, Inc., Tokyo (JP)

( * ) Notice: Subject to any disclaimer, the term of this patent is extended or adjusted under 35 U.S.C. 154(b) by 835 days.

(21) Appl. No.: 11/957,558

(22) Filed: Dec. 17, 2007

(65) Prior Publication Data

US 2008/0109371 A1    May 8, 2008

Related U.S. Application Data

(62) Division of application No. 10/457,522, filed on Jun. 10, 2003.

(30) Foreign Application Priority Data

Jun. 10, 2002 (JP) ................................. 2002-169153

(51) Int. Cl.
  *G06Q 20/00* (2012.01)
  *G06F 7/04* (2006.01)
(52) U.S. Cl. ............................................ 705/64; 726/20
(58) Field of Classification Search ...................... 705/64
  See application file for complete search history.

(56) References Cited

U.S. PATENT DOCUMENTS 5,311,595 A * 5/1994 Bjerrum et al. ............... 713/169
5,341,426 A   8/1994 Barney et al.
5,355,413 A * 10/1994 Ohno ............................. 713/159

(Continued)

FOREIGN PATENT DOCUMENTS

EP       0 762 348      3/1997

(Continued)

OTHER PUBLICATIONS

Freier et al., "The SSL Protocol, Version 3.0", Nov. 18, 1996, pp. 1-62.*

(Continued)

*Primary Examiner* — Calvin L Hewitt, II
*Assistant Examiner* — Zeshan Qayyum
(74) *Attorney, Agent, or Firm* — Oblon, Spivak, McClelland, Maier & Neustadt, L.L.P.

(57) ABSTRACT

Between an IC card (1) and a electronic ticket server (2), upon purchasing an electronic ticket a public key cryptosystem is employed for a mutual authentication to keep a strict security, and a shared secret between the electronic ticket and a ticket collecting machine is sent on a secure channel as well as the electronic ticket. Upon usage of the electronic ticket, the IC card (1) and the ticket collecting machine (6) mutually judge whether they carry out the mutual authentication by using a public key cryptosystem or a symmetric key cryptosystem. When they determine to use the symmetric key cryptosystem, they carry out the mutual authentication by using the shared secret exchanged beforehand. When they determine to use the public key cryptosystem, they carry out the mutual authentication by using the same method as that used upon purchasing the electronic ticket. This method of mutual authentication can dynamically switch cryptosystems for cryptographic communication between the IC cards or between the IC card and a tamper resistant device having an equivalent function to an IC card installed in related servers or the ticket collecting machine, based on their judgment of the types of bearers, the required degree of security and the required processing speed.

2 Claims, 7 Drawing Sheets

U.S. PATENT DOCUMENTS

| | | | |
|---|---|---|---|
| 5,577,121 A * | 11/1996 | Davis et al. | 705/67 |
| 6,005,942 A | 12/1999 | Chan et al. | |
| 6,101,477 A | 8/2000 | Hohle et al. | |
| 2002/0073040 A1 * | 6/2002 | Schwartz et al. | 705/62 |

FOREIGN PATENT DOCUMENTS

| | | |
|---|---|---|
| EP | 0 823 694 | 2/1998 |
| EP | 0 829 828 | 3/1998 |
| EP | 0 969 426 | 1/2000 |
| KR | 1999-0039365 | 6/1999 |
| KR | 2001-0079091 | 2/2001 |
| KR | 2002-0040378 | 5/2002 |

OTHER PUBLICATIONS

Freier et al., "The SSL Protocol, Version 3.0", Nov. 18, 1996, pp. 1-6.*

Kuno Yutaka, et al., "The Security Scheme for 5GHz band Eathernet based Wireless LAN", The Institute of Electronics, vol. 99, Jun. 25, 1996, pp. 7 (with partial English translation).

David Safford, et al., "Texas A&M University Anarchistic Key Authorization (AKA)", Proceedings of the $6^{th}$ conference on USENIX UNIX Security Symposium, 1996, pp. 9.

Yachida Masuyoshi, "Security function for distance medicine (Combined software and brief summary of ISCL)", Medication and computer, Japan Electronic Publishing ltd, vol. 10, No. 9, Sep. 20, 1999, pp. 7.

T. Dirks, et al., "The TLS Protocol version 1.0", RFC2246, 1999, pp. 22.

* cited by examiner

IC CARD AND AUTHENTICATION METHOD IN ELECTRONIC TICKET DISTRIBUTION SYSTEM

CROSS-REFERENCE TO RELATED APPLICATION

This application is a divisional of U.S. application Ser. No. 10/457,522, filed Jun. 10, 2003, and is based upon and claims benefit of priority from Japanese Patent Application No. 2002-169153, filed Jun. 10, 2002, the entire contents of each of which is incorporated by reference.

BACKGROUND OF THE INVENTION

1. Field of the Invention

The present invention relates to an IC card and an authentication method in an electronic ticket distribution system. More particularly, the present invention relates to an IC card that can cryptographically communicate with an opposite IC card or a tamper-resistant apparatus having an equivalent function to an IC card. The present invention also relates to an authentication method in an electronic ticket distribution system, which uses a cryptographic communication between an IC card attached in a communication terminal and the same IC card or a tamper-resistant apparatus having an equivalent function to the IC card.

2. Description of the Related Art

Cryptographic communication technologies, such as "Internet Draft The SSL Protocol Version 3.0" and "RFC2246 The TLS Protocol Version 1.0", are well known, nowadays. Since these technologies do not largely change the schemes of present network techniques and network protocols, they are very effective for transmitting critical information such as personal information and credit card numbers secretly in an open network such as the Internet.

In the conventional communication technologies, though switching encryption algorithms used for mutual authentication was possible, to switch cryptosystems in accordance with relations to the type of bearer, processing speed and other factors required in the mutual authentication was impossible.

In various situations such as purchasing an electronic ticket by using an IC card, transferring the purchased electronic ticket to other person through IC cards, and using the purchased ticket by passing an IC card through a ticket collecting machine, cryptographic communications are used between IC cards or between an IC card and an equivalent function to an IC card. In some situations, strict security is required but high speed is not required, and in other situations high speed communication is required but strict security is not required. Strict security is required when purchasing an electronic ticket because the payment process is carried out in the communication, however, speediness is not required for this communication. On the other hand, speediness is required for ticket collecting machines in order to avoid long queues forming due to a slow collecting speed.

Therefore, the ability to flexibly manipulate various cryptosystems in accordance with the above situations has long been required in a conventional cryptographic communication system.

SUMMARY OF THE INVENTION

It is an object of the present invention to provide an authentication method in an electronic ticket distribution system, which can dynamically switch cryptosystems for a cryptographic communication between IC cards or between an IC card and a tamper resistant device having an equivalent function to an IC card installed in related servers or a ticket collecting machine, based on their judgment of the types of bearers, the required degree of security and the required processing speed. The related IC cards, servers, and the ticket collecting machine can switch cryptosystems in accordance with an instruction from a switching function of authentication algorithms provided therein. For instance, they can employ an authentication process using a public key cryptosystem and exchange a shared secret each other in the purchasing process of an electronic ticket, and, in a case where high speed is required, they can employ an authentication process using a symmetric key cryptosystem, which uses the shared secret therebetween.

It is another object of the present invention to provide an IC card, which can be used in an authentication method in an electronic distribution system as set forth above.

The first aspect of the present invention is an authentication method in an electronic ticket distribution system, wherein the electronic ticket distribution system comprises: an IC card having a contact-type or a noncontact-type first interface for purchasing and storing an electronic ticket; a user terminal having a connecting port for the IC card and having an electrical communication means; a ticket server having a tamper resistant device, which has a first equivalent function to an IC card and which issues and sells electronic tickets; and a ticket collecting machine having a second equivalent function to an IC card for collecting electronic tickets upon their usage; the method comprising the steps of: judging a bearer, a required degree of security and a required processing speed between the IC card and the first or the second equivalent function to an IC card; switching an authentication algorithm in each of the IC cards, the first equivalent function to an IC card and the second equivalent function to an IC card, to a suitable one based on a judgment regarding the bearer, the required degree of security and the required processing speed; and executing an authentication process by using the switched authentication algorithm between the IC card and the first or the second equivalent function to an IC card.

The second aspect of the present invention is an authentication method in an electronic ticket distribution system, wherein the electronic ticket distribution system comprises: an IC card having a contact-type or a noncontact-type first interface for purchasing and storing an electronic ticket; a user terminal having a connecting port for the IC card and having an electrical communication means; a ticket server having a tamper resistant device, which has a first equivalent function to an IC card and which issues and sells electronic tickets; and a ticket collecting machine having a second equivalent function to an IC card for collecting electronic tickets upon their usage; the method comprising the steps of: switching an authentication algorithm in use in each of the IC cards, the first equivalent function to an IC card and the second equivalent function to an IC card to a suitable one in accordance with a predetermined setting; and executing an authentication process by using the switched authentication algorithm between the IC card and the first or the second equivalent function to an IC card.

In the authentication methods in the electronic ticket distribution system as set forth above, the IC card and the ticket server can use a public key cryptosystem for a mutual authentication, and the IC card and the ticket collecting machine can use a symmetric key cryptosystem for the mutual authentication.

The third aspect of the present invention is an IC card comprising: a storage means for storing a plurality of encryption algorithms; a communication means for communicating with an opposite IC card or a device having an equivalent function to an IC card; and a processing means for exchanging information about the stored encryption algorithms at the beginning of a mutual authentication with the opposite IC card or the device having an equivalent function to an IC card to select an encryption algorithm in use for an authentication process and for concealment of a communication message.

The fourth aspect of the present invention is an authentication method in an electronic ticket distribution system comprising the steps of: (a) sending a user's certificate and information about an encryption algorithm to be used for cryptographic communication after the authentication from an IC card, which is connected to a user terminal, to a tamper resistant device in a ticket server; (b) sending the user's certificate from the tamper resistant device in the ticket server to an authentication server in order to obtain a certification of the user's certificate; (c) sending a certificate of the tamper resistant device, information about an encryption algorithm, and encrypted data of first random numbers, which are generated in the tamper resistant device and encrypted by using a public key of the IC card, from the ticket server to the IC card, when the user's certificate is verified to be valid by the authentication server; (d) sending the certificate of the tamper resistant device from the IC card to the authentication server in order to obtain a certification of this certificate of the tamper resistant device; (e) sending encrypted data of second random numbers, which are generated by the IC card and encrypted by using a public key of the tamper resistant device, and the first random numbers decrypted by using a secret key of the IC card and attached with a first digital signature signed by using the secret key of the IC card from the IC card to the tamper resistant device, when the certificate of the tamper resistant device is verified to be valid by the authentication server; (f) verifying the first digital signature in the tamper resistant device by using the public key of the IC card, and decrypting the second random numbers by using the public key of the tamper resistant device when the first digital signature is verified to be valid; (g) attaching a second digital signature signed by using a secret key of the tamper resistant device to the decrypted second random numbers and sending the second random numbers attached with the second digital signature to the IC card from the tamper resistant device; and (h) verifying the second digital signature in the IC card by using the public key of the tamper resistant device, and completing a mutual authentication between the IC card and the tamper resistant device when the second digital signature is verified to be valid.

The fifth aspect of the present invention is an authentication method in an electronic ticket distribution system comprising the steps of: (a) sending a user's certificate and information about an encryption algorithm in use for cryptographic communication after the authentication from an IC card, which is connected to a user terminal, to a tamper resistant device in a ticket server; (b) sending the user's certificate from the tamper resistant device in the ticket server to an authentication server in order to obtain a certification of the user's certificate; (c) sending a certificate of the tamper resistant device, information about an encryption algorithm, and encrypted data of first random numbers, which are generated in the tamper resistant device and encrypted by using a public key of the IC card, from the ticket server to the IC card, when the user's certificate is verified to be valid by the authentication server; (d) sending the certificate of the tamper resistant device from the IC card to the authentication server in order to obtain a certification of the certificate of the tamper resistant device; (e) sending encrypted data of second random numbers, which are generated by the IC card and encrypted by using a public key of the tamper resistant device, from the IC card to the tamper resistant device, when the certificate of the tamper resistant device is verified to be valid by the authentication server; (f) decrypting the encrypted second random numbers by using the public key of the tamper resistant device in the tamper resistant device; (g) connecting the user's certificate, the information about the encryption algorithm in use for cryptographic communication after the authentication, the certificate of the tamper resistant device, the encrypted data of the first random numbers and the encrypted data of the second random numbers to obtain information to be sent, and encrypting the information to be sent by using a common key in the tamper resistant device; (h) sending the encrypted information from the tamper resistant device to the IC card; (i) decrypting the encrypted information from the tamper resistant device by using the common key in the IC card; and (j) comparing the decrypted information with the original information in the IC card, and completing a mutual authentication between the IC card and the tamper resistant device when the comparison is successful.

According to an authentication method in an electronic ticket distribution system of the present invention, it is possible to flexibly meet the requirements of a communication system whether the system requires strict security for secret communication, or speediness of the secret communication, while the method is used in the same IC cards. For instance, it executes an authentication process using a symmetric key cryptosystem for speediness in the case of examining electronic tickets, and it executes an authentication process using a public key cryptosystem for strict security in other cases.

Particularly, according to the first and second aspects of the present invention, an authentication method in an electronic ticket distribution system can execute an authentication process using a suitable algorithm that is selected from among a plurality of authentication algorithms stored in an IC card and an equivalent function to an IC card based on the judgment of a bearer between related devices, the required degree of security and the required processing speed.

Furthermore, according to the first and second aspects of the present invention, the authentication method in an electronic ticket distribution system can select a public key cryptosystem used for communication between an IC card and servers upon issuing an electronic ticket to the IC card for the purpose of strict security for the communication. Further, the authentication method can select a symmetric key cryptosystem used for communication between the IC card and a ticket collecting machine upon examining the electronic ticket of the IC card for the purpose of speedy communication.

According to the third aspect of the present invention, an IC card stores a plurality of encryption algorithms, and it can select encryption algorithms in use for authentication process and for concealment of communication messages from among the plurality of encryption algorithms stored therein, based on information about encryption algorithms exchanged at the beginning of a mutual authentication with an opposite device.

According to the fourth aspect of the present invention, an authentication method in an electronic ticket distribution system can execute mutual authentication between an IC card connected to a user terminal and a tamper resistant device in a ticket server by a process that can reduce transactions therebetween.

According to the fifth aspect of the present invention, an authentication method in an electronic ticket distribution system can execute mutual authentication between an IC card attached in a user terminal and a tamper resistant device in a ticket server by a process that can reduce transactions therebetween. Further, the authentication method can eliminate the necessity of a digital signature so that speediness can be acquired in the authentication process, even if a public key cryptosystem is used.

DETAILED DESCRIPTION OF THE PREFERRED EMBODIMENTS

Embodiments of the present invention will be explained in detail with reference to the accompanying drawings.

Figure 1:
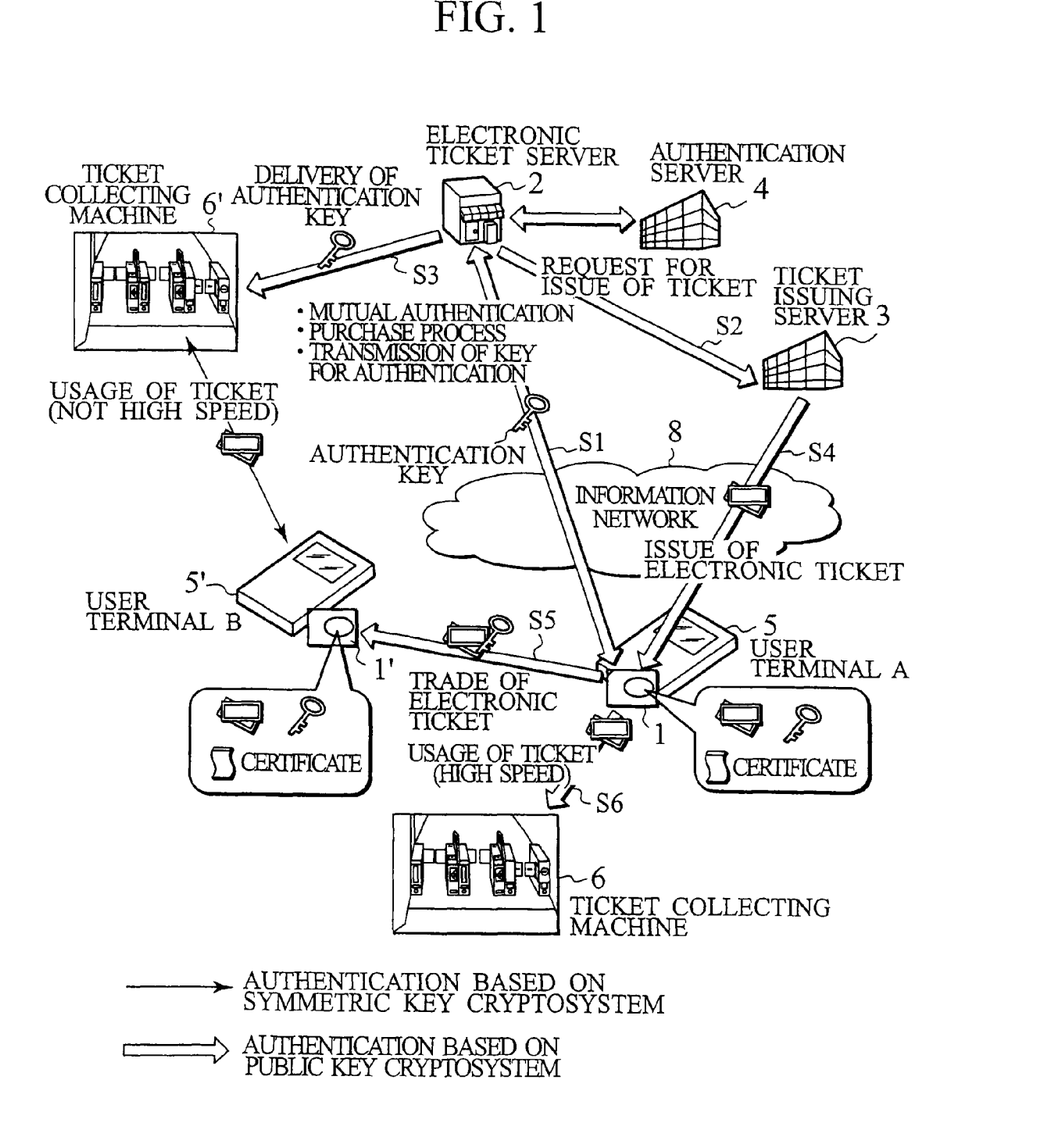
FIG. 1 is a schematic block diagram showing an electronic ticket distribution system of an embodiment of the present invention.
Figure 2:
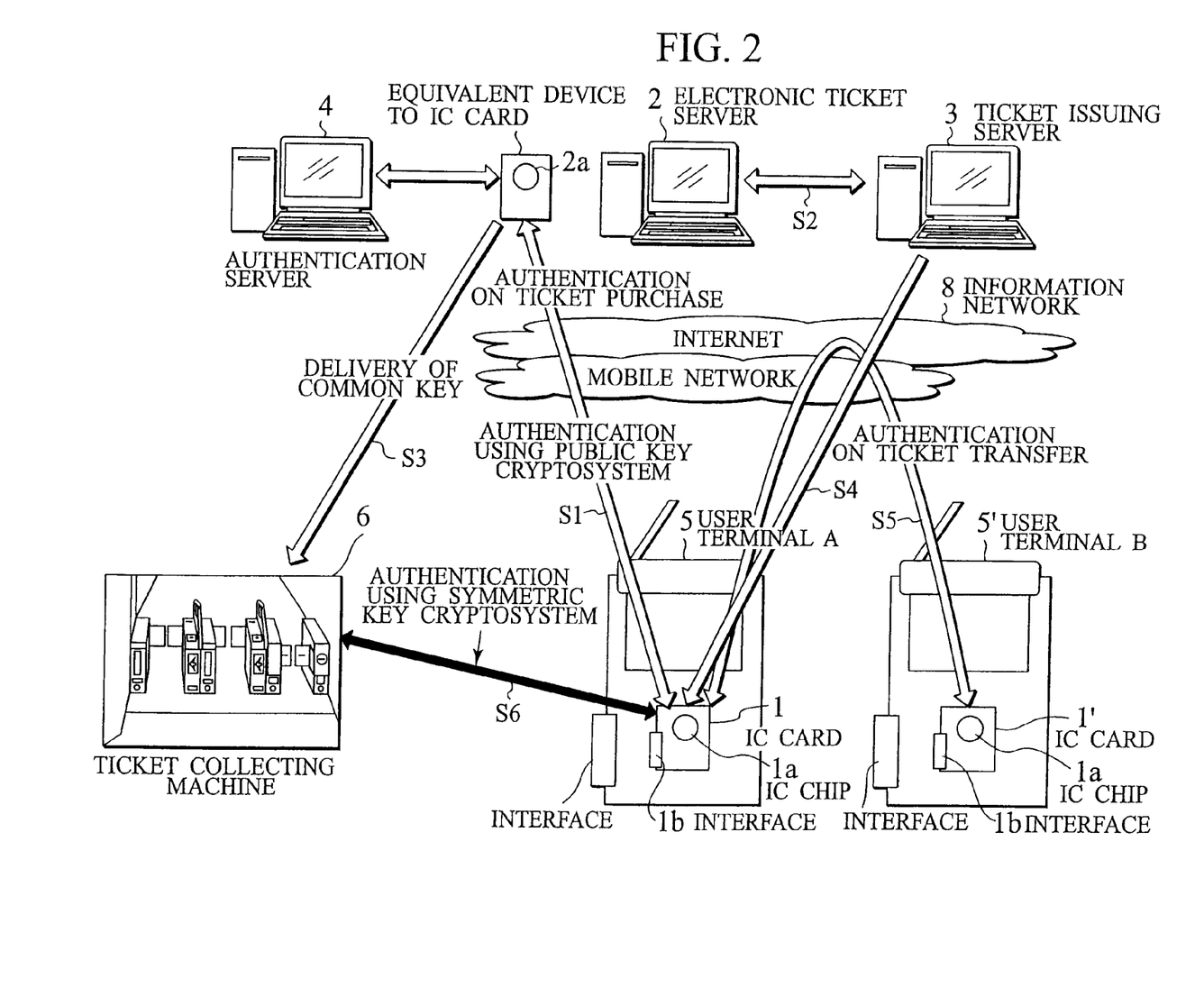
FIG. 2 is a detailed schematic block diagram showing the electronic ticket distribution system of the embodiment.

FIGS. 1 and 2 illustrate an electronic ticket distribution system of a preferred embodiment of the present invention. The electronic ticket distribution system comprises an electronic ticket server 2, a ticket issuing server 3, an authentication server 4, one or plural user terminals 5 and 5', and one or plural ticket collecting machines 6 and 6'. These components are able to connect to information network 8 for mutual communication. The information network 8 includes the Internet, a mobile network and other wired or wireless networks.

In the electronic ticket distribution system as shown in FIGS. 1 and 2, the electronic ticket server 2 has a tamper resistant device 2a, which has an equivalent function to an IC card and sells electronic tickets. The ticket issuing server 3 issues electronic tickets to appointed customers in response to requests from the electronic ticket server 2. The authentication server 4 authenticates a public key and an electronic signature. Each of the user terminals 5 and 5' has an electrical communication device and an interface such as a connecting port and an IC card slot for signal exchange with an IC card 1 or 1' attached therein. Each of the user terminals 5 and 5' can carry out the process of purchasing and storing electronic tickets in cooperation with the IC card 1 or 1' connected thereto. The ticket collecting machines 6 and 6' have equivalent functions to an IC card and collect electronic tickets from IC cards by cryptographic communication with the IC cards when the electronic tickets are used.

According to this electronic ticket distribution system, to deliver an electronic ticket to the IC card 1 from the electronic ticket server 2, they communicate using a public key cryptosystem for strict security. The electronic ticket server 2 also delivers to the IC card 1 via a secure channel an electronic ticket and the data of a key, in which a piece of information containing a shared secret between an electronic ticket and a ticket collecting machine necessary for ticket examination, is encapsulated. When authentication with the IC card 1 is successfully completed, the electronic ticket server 2 sends a request for the issuing of an electronic ticket to the ticket issuing server 3. To respond to this request from the electronic ticket server 2, the ticket issuing server 3 issues and delivers to the IC card 1 an electronic ticket of electronic value. The IC card 1 stores in its memory the electronic ticket delivered from the ticket issuing server 3. In some cases, there occurs the necessity of transferring electronic tickets between users. In such cases, an authentication process by public key cryptosystem is executed between the IC cards 1 and 1'.

When the electronic ticket is used at the ticket collecting machine 6 or 6', in accordance with communication interfaces provided therein, the IC card 1 and the ticket collecting machine 6 or 6' judge whether to use a public key cryptosystem or a symmetric key cryptosystem in their mutual authentication process. In a case where they decide to use a symmetric key cryptosystem for mutual authentication, they execute an authentication process by using a shared secret, which they exchange beforehand. On the other hand, in a case where they decide to use a public key cryptosystem for the authentication, they execute an authentication process by using the public key cryptosystem, as in the process of purchasing an electronic ticket. It should be noted that transfer of the electronic ticket is carried out only between the IC cards 1 and 1' and between the IC card 1 or 1', and the tamper resistant device 2a incorporated in the electronic ticket server 2.

A procedure required for a user to purchase an electronic ticket in this electronic ticket distribution system is as follows. The user accesses the electronic ticket server 2 from the user terminal 5 to purchase an electronic ticket. The IC card 1 in the user terminal 5 and the tamper resistant device 2a having an equivalent function to an IC card in the electronic server 2 execute mutual authentication by using a public key cryptosystem, e.g., two-way authentication used SSL (step S1).

When the mutual authentication is successful, the user sends necessary information such as a method of payment for the electronic ticket and a request for purchase. The electronic ticket server 2 processes the settlement in accordance with the method of payment acquired from the user and requests that the ticket issuing server 3 issues an electronic ticket (step S2). The electronic ticket server 2 also sends to the ticket collecting machine 6 a common key or a shared secret necessary to produce a common key for a symmetric key cryptosystem, in a case where the ticket collecting machine 6 requires a high speed process for ticket examination (step S3). The electronic ticket issued contains information about the contents of the ticket such as title, effective date or term and price, and information about the right or a pointer to the right as well as information about the shared secret to be used upon usage of the ticket. A digital signature is attached to this information, and transmitted to the IC card 1 in the user terminal 5 from the electronic ticket server 2.

Receiving the request for issue of an electronic ticket from the electronic ticket server 2, the ticket issuing server 3 transmits to the IC card 1 digital data corresponding to the electronic ticket (step S4). In the user terminal 5, the electronic ticket is directly stored in a memory of the IC card 1, and never remains in the user terminal 5 itself. By this scheme, plural users can purchase respective electronic tickets or other electronic values from the same user terminal 5 by connecting respective IC cards of their own thereto.

In a case where one user transfers an electronic ticket to another user, the former user communicates to the latter user by using their user terminals 5 and 5'. In this case, the IC cards 1 and 1' execute a mutual authentication by a public key cryptosystem and transfer the electronic ticket therebetween (step S5).

When the user uses the electronic ticket stored in the IC card 1 at the ticket collecting machine 6, if this machine 6 has a noncontact-type interface and requires a speedy process, the IC card 1 and the ticket collecting machine 6 execute a two-path mutual authentication using a symmetric key cryptosystem. In this symmetric key cryptosystem, the shared secret which was previously exchanged between the IC card 1 and the electronic ticket server 2 in the purchasing procedure of the electronic ticket us used. When the mutual authentication is successful, the electronic ticket stored in the IC card 1 is transferred to the ticket collecting machine 6 (step S6).

On the other hand, in a case where the ticket collecting machine 6' does not require a speedy process but does require high security, e.g., in a case where the electronic ticket is expensive or many users do not use the ticket collecting machine 6' at the same time, the IC card 1 and the ticket collecting machine 6' can process ticket examination by using a public key cryptosystem that is equivalent to that used between the IC cards 1 and 1' to transfer an electronic ticket (step S7).

Whether the public key cryptosystem, or the symmetric key cryptosystem is used can be predetermined by sending an indicator from the server to the IC card 1 with the purchased electronic ticket. In another method, it is possible to make the IC card 1 select a suitable cryptosystem that is mutually usable between the ticket collecting machine 6 or (3' at the beginning of the mutual authentication. The procedure of selecting a suitable cryptosystem will be explained later.

Figure 3:
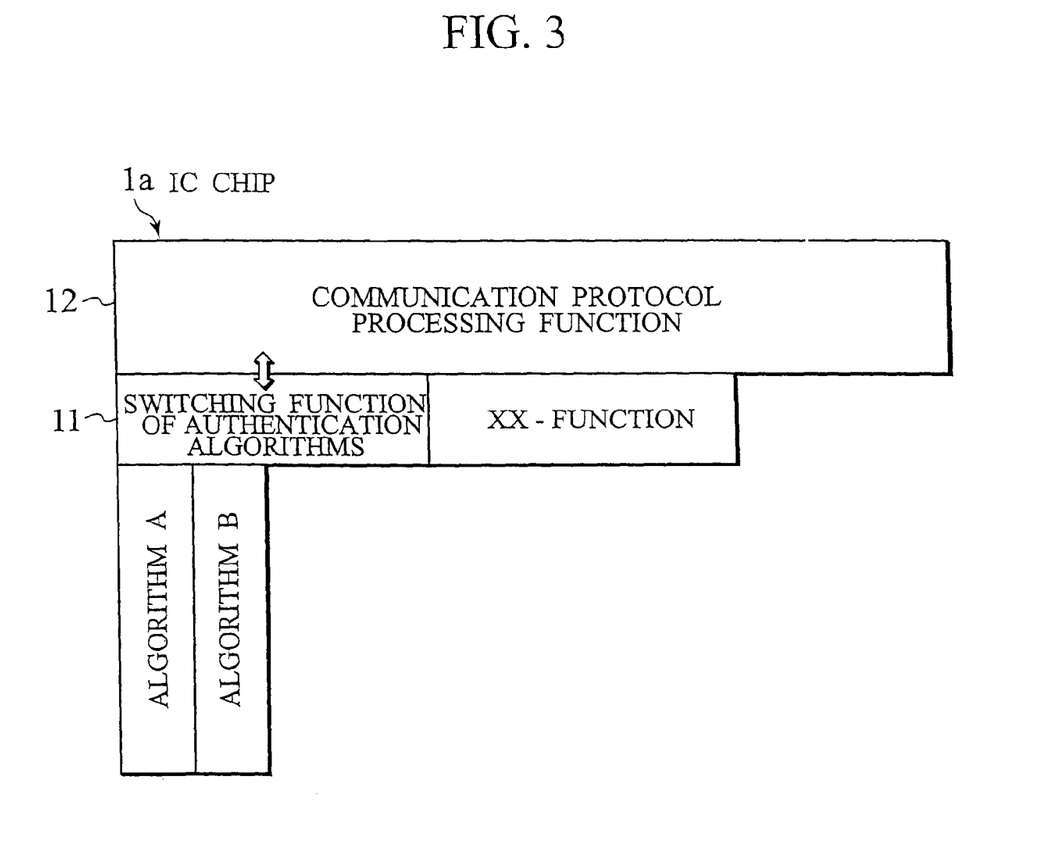
FIG. 3 is a schematic block diagram showing a functional construction of an IC card used in the electronic ticket distribution system of the embodiment.

To realize the selection function of cryptosystems as set forth above, necessary functions as shown in FIG. 3 are installed in the IC cards 1 and 1' as a software program. The IC card 1 as well as the IC card 1' incorporates an IC chip 1a. As precisely shown in FIG. 4, the IC chip 1a comprises a ROM 21 for storing an OS program and other fixed programs and fixed data, a RAM 22 as working storage, an EEPROM 23 for storing an application program, and a CPU 24 for processing operations. The IC card 1 also has a noncontact-type interface and/or a contact-type interface 1b for communication with the user terminal 5.

Figure 4:
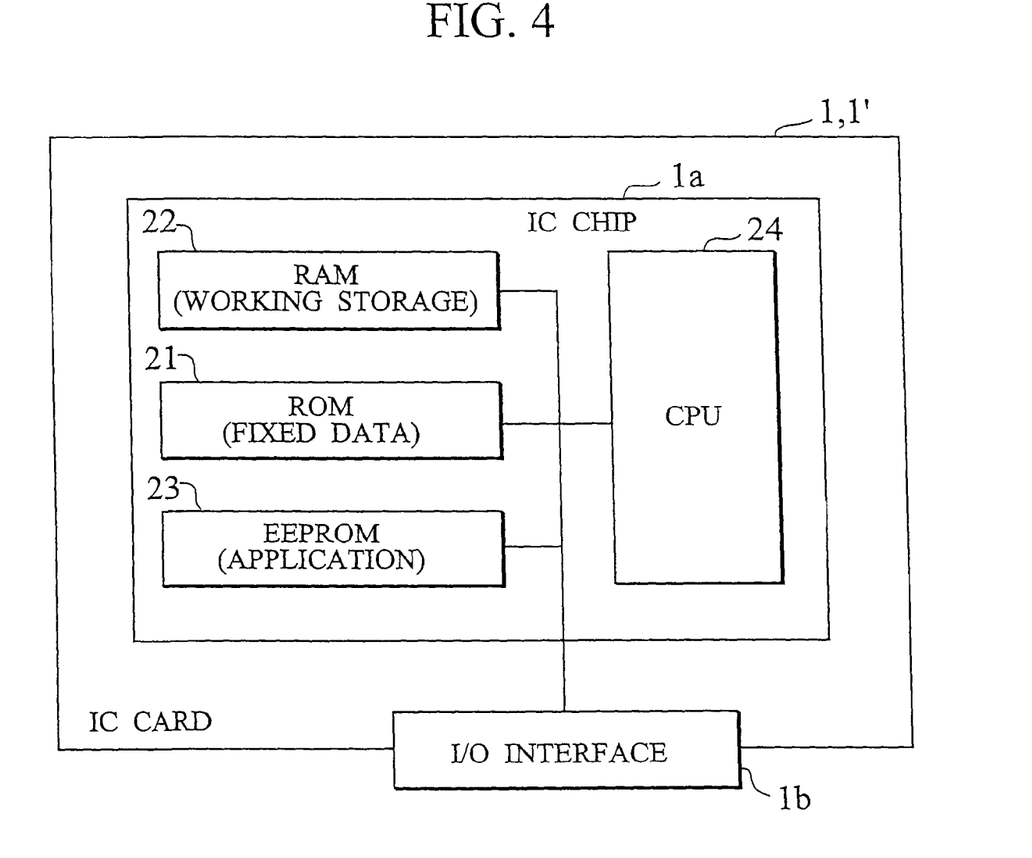
FIG. 4 is a schematic block diagram showing an inner configuration of an IC chip included in an IC card, which is used in the electronic ticket distribution system of the embodiment.

When a user wants to purchase an electronic ticket, first, the user should insert the IC card 1 to the card slot of the user terminal 5 to connect the interface 1b with a corresponding interface provided in the user terminal 5 for mutual communication therebetween. Next, the user should connect the user terminal 5 to the information network 8 to access the electronic ticket server 2, and take the necessary steps for purchase from the user terminal 5. By this operation of the user terminal 5, a purchased electronic ticket is transmitted from the ticket issuing server 3 into the RAM in the IC chip 1a of the IC card 1 and stored therein. Together with the data of the electronic ticket, data of an encryption key to be used for a mutual authentication with a ticket collecting machine 6 or 6', and data of an encryption key to be used for concealment of data communication are transmitted. This encryption key data is also stored in the RAM of the IC chip 1a.

Contents of the data of the encryption keys stored in the IC card 1 are (1) data of a private key of a user and of a public key of the electronic ticket server 2, which are necessary for mutual authentication in a public key cryptosystem, and (2-1) data of a private key of the user and of a public key of the ticket collecting machine, in a case where a public key cryptosystem is also used in communication between the IC card 1 and the ticket collecting machine 6, or (2-2) data of a common key or shared secret necessary for producing a secret key, in a case where a symmetric key cryptosystem is used in communication between the IC card 1 and the ticket collecting machine 6.

Referring to FIG. 3, a switching function of authentication process 11 realized by application software installed in the IC chip 1a selects one of plural authentication algorithms A, B, C and so on. The switching function of authentication process 11 uses the selected authentication algorithm to convert encrypted data in the IC chip 1a to data of a predetermined specific communication protocol and passes the converted data to a communication protocol processing function 12, and reversely converts data of the predetermined communication protocol received from the communication protocol processing function 12 into the original encrypted data. The communication protocol processing function 12 conducts wireless or wired communication with other devices by using a predetermined communication protocol.

When the IC card 1 communicates with the electronic ticket server 2 for purchasing an electronic ticket, when it communicates with other IC card 1' via the user terminals 5 and 5' for transferring an electronic ticket and when it uses an electronic ticket at the ticket collecting machine 6 or 6', authentication algorithms in use may differ according to the types of the electronic ticket server 2, the types of the ticket collecting machines 6 and 6', and also the types of the IC cards 1 and 1'.

For instance, possible encryption algorithms are such as "Camellia" and "AES" for a symmetric key cryptosystem, and "Triple DES" for a public key cryptosystem, as well as others. It is preferable to give an order of priority among the encryption algorithms for mutual communication according to the types of IC cards and types of ticket collecting machines. The order of priority is determined according to whether speed or security should be prioritized, and by taking into account machinery performance. At the beginning of a mutual authentication between IC cards or between an IC card and a tamper resistant device having an equivalent function to an IC card, they exchange information about types of encryption algorithms stored therein and information about the order of priority among the encryption algorithms. Then, they select an encryption algorithm of the highest priority from among mutually usable encryption algorithms for their mutual authentication and communications. This information is stored in the ROM or the EEPROM of the IC chip 1a in the IC card 1.

Figure 5:
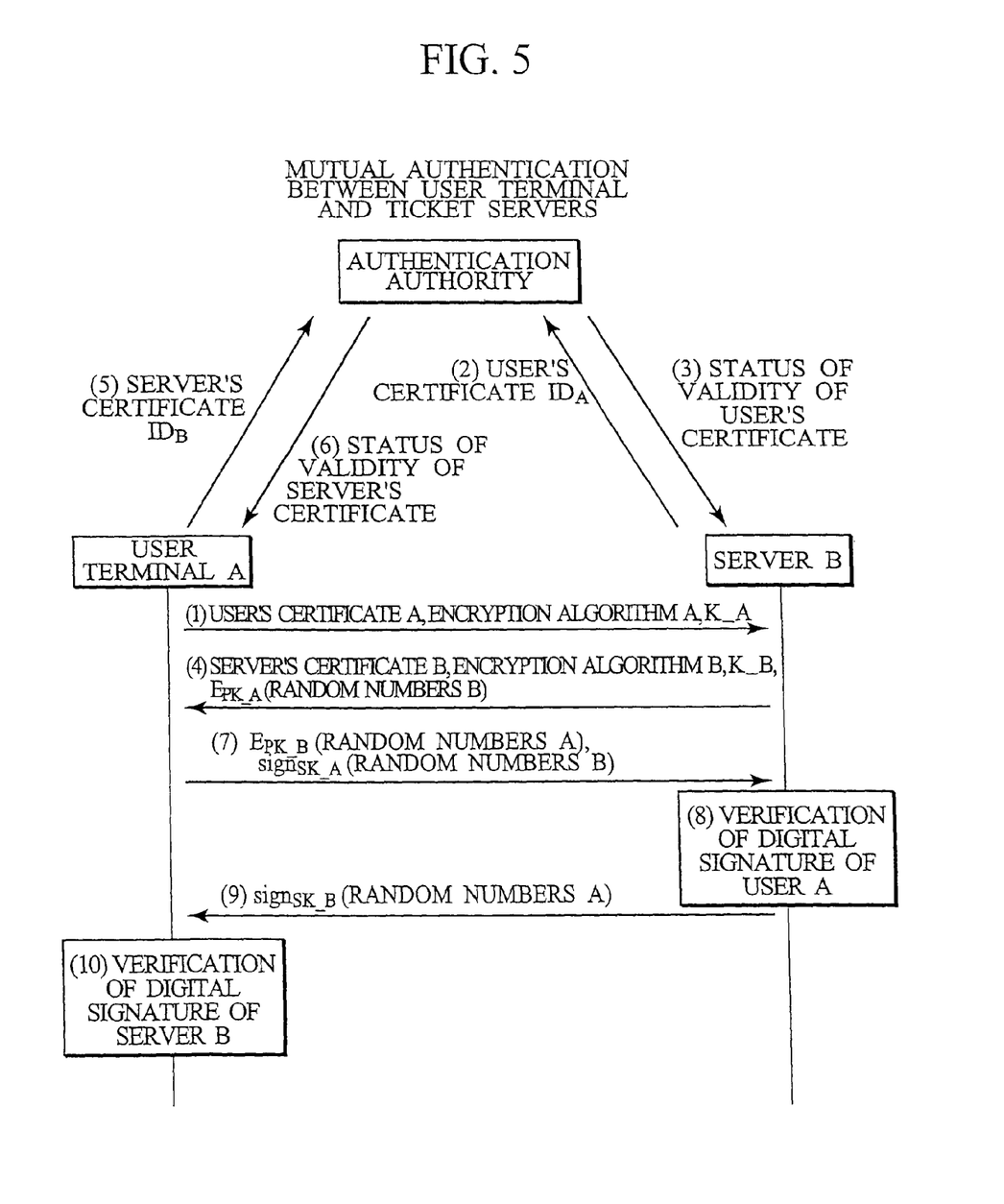
FIG. 5 is a sequential flowchart showing an authentication method using a public key cryptosystem according to the electronic ticket distribution system of the embodiment.
Figure 6:
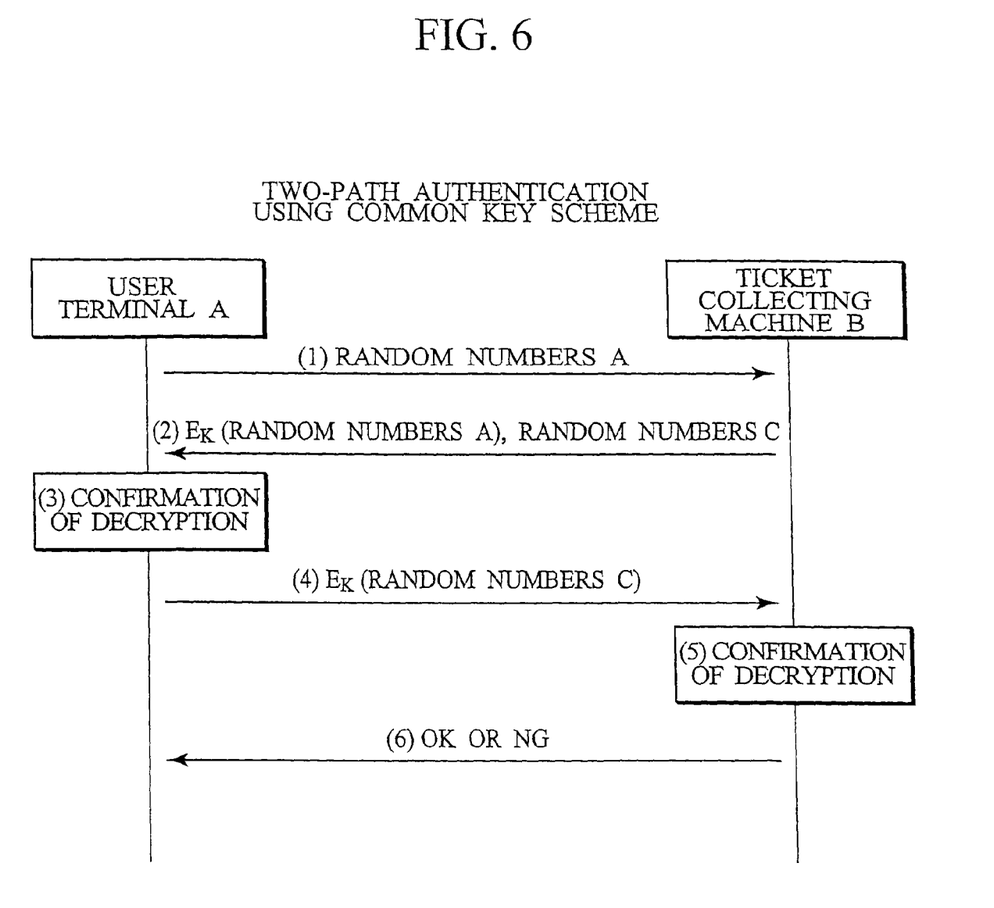
FIG. 6 is a sequential flowchart showing an authentication method using a symmetric key cryptosystem according to the electronic ticket distribution system of the embodiment.

Referring to FIGS. 5 and 6, an authentication method executed in the electronic ticket distribution system will be explained hereinafter. Suppose that a user A who wants to purchase an electronic ticket has already obtained a required certification and stored his/her public key in his/her IC card 1, where the key is used in cryptographic communication using a public key cryptosystem. Also suppose that the user A has connected the IC card 1 to a user terminal 5. Further, suppose that the user A has accessed an electronic ticket server 2 from the user terminal 5 via information network 8 and has logged in to a page of an electronic ticket shop.

<I> Mutual Authentication Procedure Between the IC Card and the Electronic Ticket Server The procedure required after the login until the purchase of an electronic ticket is as the sequence shown in FIG. 5. In FIG. 5, the electronic ticket server 2 is identified as a server B and the user terminal 5, to which the IC card 1 of the certified user A is connected, is identified as a user terminal A. It should be noted that the mutual authentication itself is actually executed between the IC card 1 and a tamper resistant device, which has an equivalent function to an IC card, incorporated in the electronic ticket server 2. The sequence of the procedure shown in FIG. 5 is a method that requires the least transactions between the user terminal A and the server B.

(1) The user terminal A sends to the server B a user's certificate A, a piece of information about an encryption algorithm to be used in cryptographic communication after the authentication (hereinafter, this information is referred to as "encryption algorithm A" for short) and the public key K_A.

(2) The server B sends a piece of information about the user's certificate $ID_A$ to an authentication server 4 (hereinafter, referred to as "authentication authority") via an on-line network provided between them in order to verify the validity of the certificate A.

(3) The authentication authority verifies whether the user's certificate is valid or invalid and sends back a result of the verification to the server B.

(4) When the server B confirms that the user's certificate A is bona fide and valid, the server B sends to the user terminal A a server B's certificate B, a piece of information about an encryption algorithm (hereinafter, referred to as "encryption algorithm B"), a public key of the server B K_B and encrypted data of random numbers B $E_{PK\_A}$(random numbers B), where the random numbers B are generated by the server B and encrypted by the public key of the user A K_A.

(5) The user terminal A sends a piece of information about the server B's certificate $ID_B$ to the authentication authority in order to obtain the verification of the server B's certificate B.

(6) The authentication authority verifies whether the server B's certificate B is valid or invalid and sends back a result of the verification to the user terminal A.

(7) When the user terminal A confirms that the server B's certificate B is bona fide and valid, the user terminal A sends to the server B an encrypted data of random numbers A $E_{PK\_B}$(random numbers A) and the random numbers B with a digital signature signed by a user A's private key SK_A $sing_{SK\_A}$(random numbers B), where the random numbers A are generated by the user terminal A and encrypted by the public key of the server B K_B, and the random numbers B are decrypted by the user A's private key SK_A.

(8) The server B verifies the digital signature of the user A signed to the random numbers B by using the user A's public key PK_A.

(9) When the server B validates the digital signature of the user A, the server B decrypts the random numbers A by using the server B's public key PK_B, and sends to the user terminal A the random numbers A with a digital signature signed by a server B's private key SK_B $sing_{SK\_B}$ (random numbers A).

(10) The user A verifies the digital signature of the server B signed to the random numbers A by using the server B's public key PK_B. If this verification is successful, the mutual authentication is successfully completed.

With the completion of the mutual authentication, the IC card A and the electronic ticket server B mutually proceed purchasing process of an electronic ticket by using a cryptosystem. In this cryptosystem, a common key that is obtained by running the random numbers A and B through a hash function. The random numbers A and B are those that were restored by using the most highly prioritized commonly usable encryption algorithm between the IC card A and the server B, where the information about the commonly usable encryption algorithms were exchanged in steps (1) and (4).

In the case where an electronic ticket stored in the IC card 1 is traded to another user's IC card 1', a mutual authentication of the IC cards 1 and 1' is carried out by using a public key cryptosystem between the user terminals 5 and 5', to which the IC cards 1 and 1' are connected, respectively. Here, it is supposed that both parties relating to the trade of this ticket have obtained information about the other party's public key and stored it in the IC cards 1 and 1' beforehand by using the public key cryptosystem, respectively.

According to this communication method using the cryptosystem set forth above, transactions in a procedure for mutual authentication between the user terminal and the electronic ticket server can be reduced.

<II> Mutual Authentication Procedure Between the Ticket Collecting Machine and the IC Card Upon usage of electronic tickets, depending on the situation, an authentication procedure between a user terminal A and a ticket collecting machine C is carried out by using a two-path mutual authentication that employs a symmetric key cryptosystem. In a case where high speed performance is required for the ticket collecting machine in accordance with circumstances relating to where the machine is installed and other factors, the symmetric key cryptosystem is used for the mutual authentication. In addition, in a case where load to the ticket collecting machine for an authentication process will be too heavy if a public key cryptosystem is employed, the symmetric key cryptosystem is also used. In these cases, the mutual authentication procedure is carried out according to a sequence as shown in FIG. 6.

(1) The user terminal A generates random numbers A and sends them to the ticket collecting machine C.

(2) The ticket collecting machine C encrypts the random numbers A into $E_K$(random numbers A) by a symmetric key encryption algorithm which uses a shared secret as a encryption key K obtained from the ticket server upon the purchasing procedure of the electronic ticket. The encrypted random numbers $E_K$(random numbers A) is sent to the user terminal A with random numbers C generated by the ticket collecting machine C.

(3) The user terminal A confirms whether it is possible to decrypt the random numbers $E_K$(random numbers A) by using the shared secret as the key K.

(4) When the possibility of the decryption of the random numbers A is confirmed, the user terminal A encrypts the random numbers C to encrypted random numbers $E_K$(random numbers C) by using the symmetric key encryption algorithm and the shared secret as the key K, and sends the encrypted random numbers $E_K$(random numbers C) to the ticket collecting machine C.

(5) The ticket collecting machine C confirms whether the encrypted random numbers $E_K$(random numbers C) are properly encrypted by using the shared secret as the key K.

(6) When the ticket collecting machine C can confirm that the encrypted random numbers $E_K$(random numbers C) are properly encrypted, the machine judges the completion of the mutual authentication and sends an "OK" message to the user terminal A. In the case where the confirmation fails, the collecting machine C sends to the user terminal A an "NG" message.

With the completion of the mutual authentication by the symmetric key cryptosystem, the IC card A and the ticket collecting machine C mutually proceed collecting process of the electronic ticket by using a cryptosystem. In this cryptosystem, a common key that is obtained by running the random numbers A and C through a hash function. The random numbers A and C are those that were exchanged during the authentication procedure.

In a case where the electronic ticket stored in the IC card 1 is used at the ticket collecting machine 6', which does not have a high performance as is shown in FIGS. 1 and 2 or which is installed at a place where a high speed process is not required, it is possible to use a public key cryptosystem. To meet this purpose, it is effective for the electronic ticket server 2 to include a piece of information about the use of the public key cryptosystem upon usage of a ticket with a piece of information related to the electronic ticket into the IC card 1 when the server delivers the electronic ticket to the IC card 1. Alternatively, it is also effective for the IC card 1 and the ticket collecting machine 6' to exchange information about the cryptosystem upon the usage of the ticket by a predetermined protocol at the beginning of the communication between them via a noncontact interface or a contact interface. With this preparation, the switching function of authentication process 11 provided in the IC card 1 becomes capable of selecting the authentication procedure using the public key cryptosystem. In this case, the procedure <I> set forth above is used in the mutual authentication using the public key cryptosystem between the IC card 1 and the ticket collecting machine 6'.

Figure 7:
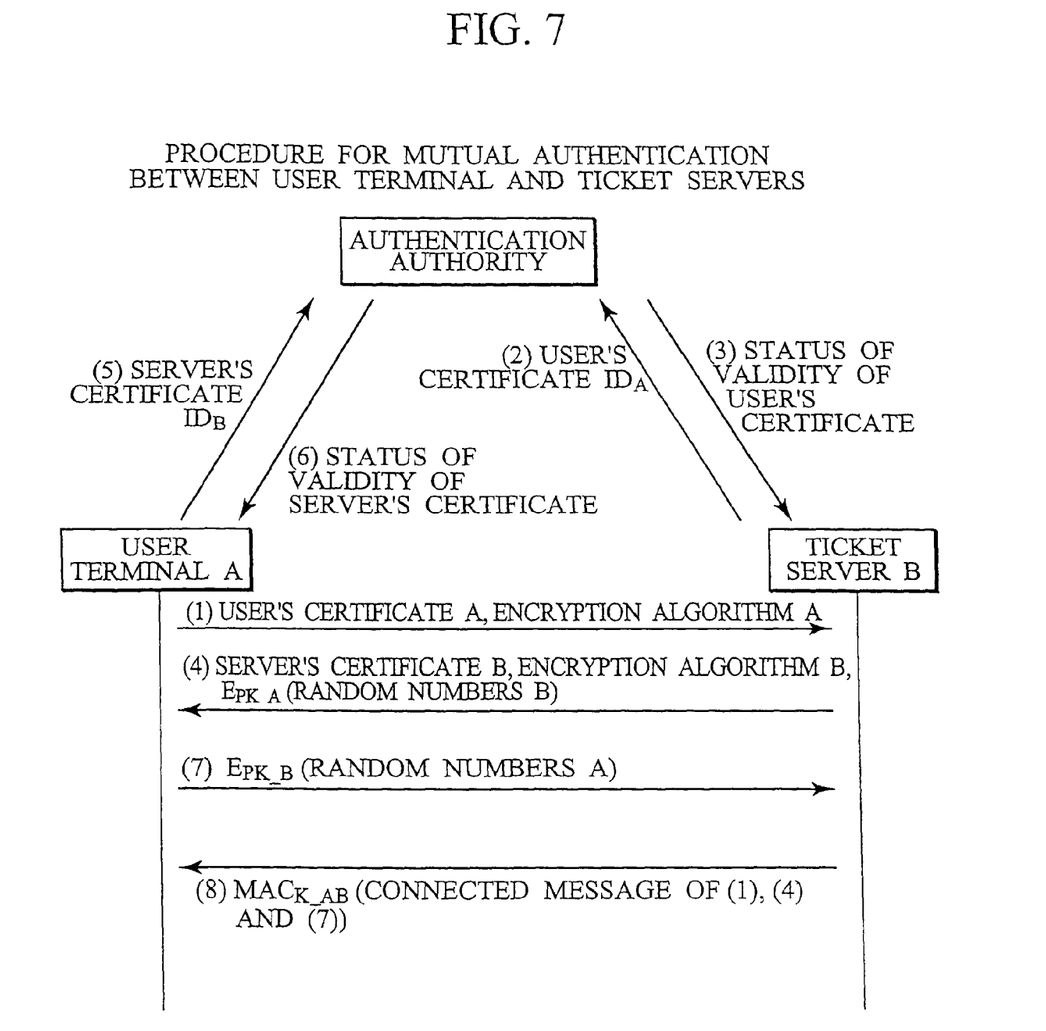
FIG. 7 is a sequential flowchart showing an authentication method in an electronic ticket distribution system of a second embodiment of the present invention.

A second embodiment of the present invention will be explained hereinafter with reference to FIG. 7. The second embodiment relates to an authentication method in an electronic ticket distribution system. The method also uses a public key cryptosystem, though the method of this embodiment differs from that of the first embodiment and it does not employ the digital signature, so that the method of this embodiment is simpler than that of the first embodiment.

(1) The user terminal A sends to the server B a user's certificate A and a piece of information about an encryption algorithm to be used in cryptographic communication after the authentication (hereinafter, this information is referred to as "encryption algorithm A").

(2) The server B sends a piece of information about the user's certificate $ID_A$ to an authentication server 4 (hereinafter, referred to as "authentication authority") via an on-line network provided between them in order to verify the validity of the certificate A.

(3) The authentication authority verifies whether the user's certificate A is valid or invalid and sends back a result of the verification to the server B.

(4) When the server B confirms that the user's certificate A is bona fide and valid, the server B sends to the user terminal A a server B's certificate B, a piece of information about an encryption algorithm (hereinafter, referred to as "encryption algorithm B"), a public key of the server B K_B and encrypted data of random numbers B $E_{PK\_A}$(random numbers B), where the random numbers B are generated by the server B and encrypted by the public key of the user A K_A.

(5) The user terminal A sends a piece of information, about the server B's certificate $ID_B$ to the authentication authority in order to obtain the verification of the server B's certificate B.

(6) The authentication authority verifies whether the server B's certificate B is valid or invalid and sends back a result of the verification to the user terminal A.

(7) When the user terminal A confirms that the server B's certificate B is bona fide and valid, the user terminal A sends to the server B an encrypted data of random numbers A $E_{PK\_B}$(random numbers A), where the random numbers A are generated by the user terminal A and encrypted by the public key of the server B K_B.

(8) The server B combines the messages received in steps (1), (4) and (7) to obtain combined data, and against the combined data, the server B further calculates an MAC (Message Authentication Code) $MAC_{K\_AB}$ by using the key K_AB. The server B sends the $MAC_{K\_AB}$ to the user terminal A. The user terminal calculates against the messages sent in steps (1), (4) and (7) in the same manner as the server B and compares the result with the $MAC_{K\_AB}$ received from the server B. If the comparison is successful, the mutual authentication between the IC card A and the electronic ticket server B is completed.

With the completion of the mutual authentication, the IC card A and the electronic ticket server B mutually proceed purchasing process of the electronic ticket by using a cryptosystem. In this cryptosystem, a common key that is obtained by running the random numbers A and B through a hash function. The random numbers A and B are those that were restored by using the most highly prioritized commonly usable encryption algorithm between the IC card A and the server B, where the information about the commonly usable encryption algorithms were exchanged at steps (1) and (4).

In the second embodiment, trade of the electronic ticket between users and usage of the ticket at a ticket collecting machine is the same as the first embodiment set forth above.

According to this communication method using the cryptosystem set forth above, transactions in a procedure for mutual authentication between the user terminal and the electronic ticket server can also be reduced.

What is claimed is:

1. An IC card comprising:
   a storage means for storing a plurality of encryption algorithms and first information about an order of priority among the plurality of encryption algorithms;
   a communication means for communicating with a communication target, the communication target including an other IC card or an other equivalent function to an IC card;
   a processing means for exchanging information about the stored encryption algorithms with the communication target at the beginning of a mutual authentication with the communication target in order to select an encryption algorithm to use for an authentication procedure and for concealment of a communication message, and receiving information about types of encryption algorithms stored in the communication target and second information about an order of priority among the encryption algorithms stored in the communication target; and
   an authentication process switching means for switching among the plurality of encryption algorithms, and selecting one of the plurality of encryption algorithms stored in the storage means based on the order of priority among the plurality of encryption algorithms stored in the storage means and the order of priority among the encryption algorithms stored in the communication target received by the processing means.

2. The IC card according to claim 1, wherein, when strict security is required when using an electronic ticket, the authentication process switching means switches to the encryption algorithm corresponding to the public key cryptosystem with strict security.

* * * * *

UNITED STATES PATENT AND TRADEMARK OFFICE
CERTIFICATE OF CORRECTION

PATENT NO. : 8,306,919 B2  
APPLICATION NO. : 11/957558  
DATED : November 6, 2012  
INVENTOR(S) : Ken Sakamura et al.

Page 1 of 1

It is certified that error appears in the above-identified patent and that said Letters Patent is hereby corrected as shown below:

On the title page, Item (73), the second Assignee's name is incorrect. Item (73), should read:

--(73) Assignees: Ken Sakamura, Tokyo (JP); Noboru Koshizuka, Musashino-shi (JP), NTT DoCoMo, Inc., Tokyo (JP)--

Signed and Sealed this
First Day of January, 2013

David J. Kappos
*Director of the United States Patent and Trademark Office*